(12) United States Patent
Hanks et al.

(10) Patent No.: US 7,596,067 B2
(45) Date of Patent: Sep. 29, 2009

(54) METHOD OF LASER SPOT LOCATION AND ADJUSTMENT THEREOF

(75) Inventors: D. Mitchel Hanks, Fort Collins, CO (US); Lawrence N. Taugher, Loveland, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 751 days.

(21) Appl. No.: 11/214,203

(22) Filed: Aug. 29, 2005

(65) Prior Publication Data

US 2007/0047403 A1   Mar. 1, 2007

(51) Int. Cl.
*G11B 7/00* (2006.01)
(52) U.S. Cl. .................. 369/53.1; 369/53.16; 369/53.39
(58) Field of Classification Search .............. 369/44.41, 369/44.42, 44.37, 112.01, 44.26, 53.1, 53.16, 369/53.39, 47.1, 44.31, 44.38, 44.39, 47.27, 369/47.21, 53.21; 347/2, 5, 9
See application file for complete search history.

(56) References Cited

U.S. PATENT DOCUMENTS

| | | | |
|---|---|---|---|
| 4,695,992 A | 9/1987 | Aoi | |
| 5,105,410 A | 4/1992 | Maeda et al. | |
| 5,594,711 A * | 1/1997 | Koyama | ................... 369/44.37 |
| 5,666,345 A | 9/1997 | Takahashi et al. | |
| 5,835,469 A | 11/1998 | Maeda et al. | |
| 6,232,045 B1 | 5/2001 | Jacobowitz et al. | |
| 6,736,475 B2 * | 5/2004 | Youngberg et al. | ............. 347/2 |
| 2003/0012113 A1 | 1/2003 | Rogers et al. | |

* cited by examiner

*Primary Examiner*—Nabil Z Hindi

(57) ABSTRACT

This invention relates to a method of determining the location of a plurality of laser spots, comprising: determining a first distance of a first laser spot; determining a second distance of the first laser spot; determining a first distance of a second laser spot; determining a second distance of the second laser spot; and adjusting, if necessary, the locations of the first and second laser.

32 Claims, 7 Drawing Sheets

METHOD OF LASER SPOT LOCATION AND ADJUSTMENT THEREOF

BACKGROUND OF THE INVENTION

1. Field of the Invention

This invention relates to a method of determining the location of a plurality of laser spots, comprising: determining a first distance of a first laser spot; determining a second distance of the first laser spot; determining a first distance of a second laser spot; determining a second distance of the second laser spot; and adjusting, if necessary, the locations of the first and second laser spots.

2. Description of the Related Art

Prior to the present invention, as set forth in general terms above and more specifically below, it is known, that an optical disc, such as a compact disc (CD), is an electronic data storage medium that can be written to and read using a low-powered laser beam. Optical disc technology first appeared in the marketplace with the CD, which is typically used for electronically recording, storing, and playing back audio, video, text, and other information in digital form. A digital versatile disc (DVD) is another more recent type of optical disc that is generally used for storing and playing back movies because of its ability to store much more data in the same space as a CD.

CDs were initially a read-only storage medium that stored digital data as a pattern of bumps and flat areas impressed into a piece of clear polycarbonate plastic through a complex manufacturing process. However, average consumers can now burn their own CDs with CD players capable of burning digital data into CD-Rs (CD-recordable discs) and CD-RWs (CD-rewritable discs). CD-Rs have a layer of translucent photosensitive dye that turns opaque in areas that are heated by a laser. Areas of opaque and translucent dye vary the disc reflectivity which enables data storage in a permanent manner analogous to the bumps and flat areas in conventional CDs. CD-RWs represent the bumps and flat areas of conventional CDs through phase shifts in a special chemical compound. In a crystalline phase the compound is translucent, while in an amorphous phase it is opaque. By shifting the phase of the compound with a laser beam, data can be recorded onto and erased from a CD-RW.

Methods for labeling the non-data side of such optical discs with text and images, for example, have continued to develop as consumers desire more convenient ways to identify the data they've burned onto their own CDs. Basic methods for labeling a disc include physically writing on the non-data side with a permanent marker (e.g., a sharpie marker) or printing out a paper sticker label and sticking it onto the non-data side of the disc. Other physical marking methods developed for implementation in conventional CD players include ink jet, thermal wax transfer, and thermal dye transfer methods. Still other methods use the laser in a conventional CD player to mark a specially prepared CD surface. Such methods apply equally to labeling CDs and DVDs.

A problem with labeling CDs is that there are no tracks or other markings on the label surface (i.e., the non-data side, or top side) of the CD to determine radial and circumferential positioning. Therefore, the radial and circumferential positioning of a laser spot, for example, to begin printing a label or to append a previously marked label can result in misapplied labels. For example, a label may overlap onto itself if the label data is printed at a radius that is too close to the inner diameter of the disc. Likewise, a label may have gaps if the label data is printed at a radius that is too far from the inner diameter of the disc.

Accordingly, the need exists for a way to determine radial and circumferential positioning on an optical disc surface that has no tracks or other markings, such as the non-data or label surface of an optical disc.

Another problem with labeling CDs is that if multiple laser beams are used to place marks on the label surface, it is difficult to determine the distance between the multiple beams so as to determine the tracks spacing for the disk and drive combination. Therefore, there exists a further need for a way to determine the distance between multiple beams so that the marks can be properly placed on the label surface.

It is apparent from the above that there exists a need in the art for a way to determine the distance between multiple beams so that the marks can be properly placed on the label surface It is a purpose of this invention to fulfill this and other needs in the art in a manner more apparent to the skilled artisan once given the following disclosure.

SUMMARY OF THE INVENTION

Generally speaking, an embodiment of this invention fulfills these needs by providing a method of determining the location of a plurality of laser spots, comprising: determining a first distance of a first laser spot; determining a second distance of the first laser spot; determining a first distance of a second laser spot; determining a second distance of the second laser spot; and adjusting, if necessary, the locations of the first and second laser spots.

In certain preferred embodiments, the first distances of the first and second laser spots are circumferential distances. The second distances of the first and second laser spots are radial distances.

In another further preferred embodiment, the method is used to determine the distance between multiple beams so that the marks can be properly placed on the label surface.

The preferred laser spot location determination method, according to various embodiment of the present invention, offers the following advantages: ease-of-use; excellent laser spot circumferential distance determination characteristics; excellent laser spot radial distance determination characteristics; and excellent determination of the distance between a plurality of beams. In fact, in many of the preferred embodiments, these factors of ease-of-use, excellent laser spot circumferential distance determination characteristics, excellent laser spot radial distance determination characteristics, and excellent determination of the distance between a plurality of beams are optimized to an extent that is considerably higher than heretofore achieved in prior, known laser spot location determination methods.

The above and other features of the present invention, which will become more apparent as the description proceeds, are best understood by considering the following detailed description in conjunction with the accompanying drawings, wherein like characters represent like parts throughout the several views and in which:

DETAILED DESCRIPTION OF THE INVENTION

Figure 1:
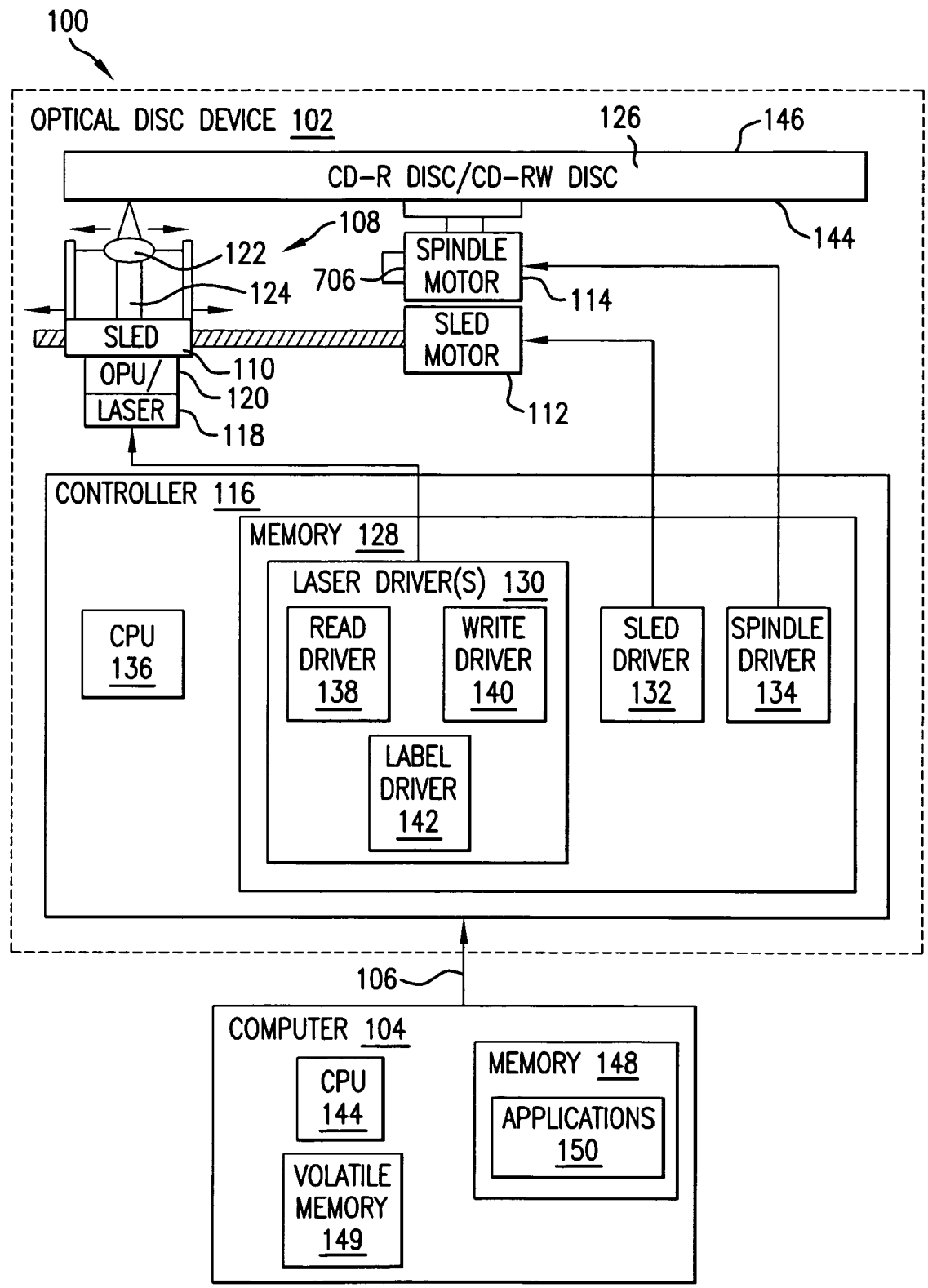
FIG. 1 illustrates an exemplary embodiment for implementing radial and circumferential position registration on a trackless optical disc surface, according to one embodiment of the present invention.

With reference first to FIG. 1, there is illustrated one preferred embodiment for use of the concepts of this invention. FIG. 1 illustrates an exemplary environment for implementing one or more embodiments of a system for position in determination on a trackless optical disc surface. The exemplary environment 100 of FIG. 1 includes an optical disc device 102 operatively coupled to a host computer or recording system 104 through a network 106. It is to be understood that environment 100 is described in commonly owned, U.S. patent application Ser. No. 10/347,074, entitled "Radial Position Registration for a Trackless Optical Disk Surface", filed on Jan. 17, 2003, which is hereby incorporated in its entirety.

Network 106 is typically an ATAPI (Advanced Technology Attachment Packet Interface) device interface, which is one of many small computer parallel or serial device interfaces. Another common computer interface is SCSI (small computer system interface), which is a generalized device interface for attaching peripheral devices to computers. SCSI defines the structure of commands, the way commands are executed, and the way status is processed. Various other physical interfaces include the Parallel Interface, Fiber Channel, IEEE 1394, USB (Universal Serial Bus), and ATA/ATAPI. ATAPI is a command execution protocol for use on an ATA interface so that CD-ROM and tape drives can be on the same ATA cable with an ATA hard disk drive. ATAPI devices generally include CD-ROM drives, CD-Recordable drives, CD-Rewritable drives, DVD (digital versatile disc) drives, tape drives, super-floppy drives (e.g., ZIP and LS-120), and so on.

Optical disc device 102 is typically implemented as a writable CD (compact disc) player/drive that has the ability to write data onto an optical disc such as a CD-R (CD-recordable disc) and a CD-RW (CD-rewritable disc). Such writable CD devices 102 are often called CD burners. More generally, an optical disc device 102 may include, for example, a standalone audio CD player that is a peripheral component in an audio system, a CD-ROM drive integrated as standard equipment in a PC (personal computer), a DVD (digital versatile disc) player, and the like. Therefore, although optical disc device 102 is discussed herein as being a CD player/burner, optical disc device 102 is not limited to such an implementation.

As illustrated in FIG. 1, an exemplary optical disc device 102, such as a CD burner, generally includes a laser assembly 108, a sled 110 or carriage for laser assembly 108, a sled motor 112, a disc or spindle motor 114, hall sensors 706, and a controller 116. Laser assembly 108 mounted on sled 110 includes a laser source 118, an optical pickup unit (OPU) 120, and a focusing lens 122 to focus a plurality of laser beams 124 to laser spots on a writable CD 126 (e.g., a CD-R or CD-RW). It is to be understood that the plurality of laser beams 124 are routed across disk 126 by conventional steering mirrors (not shown). At disk 126, laser beams 124 are reflected downward to hit the surface of disk 126 at a 90 degree angle. Because of the spots from laser beams 124 are approximately 25 microns in diameter and because the path lengths are relatively long, there are number of variables that can affect the exact direction of beams. Consequently, it is difficult to make the beams 124 fall on top of one another at the surface of disk 126. OPU 120 further includes four photodiodes and a beam splitter (not shown) for tracking and focus feedback. In general, tracking the data side (144) of a conventional disc 126 with laser assembly 108 for reading and writing data is based on radial position registration information that is readily available from a continuous data track that spirals out from the center of the disc 126. Tracking is achieved through a conventional push-pull tracking scheme involving sensing reflected interference with the four photodiodes.

Controller 116 typically includes a memory 128 such as Random Access Memory (RAM) and/or non-volatile memory for holding computer/processor-readable instructions, data structures, program modules, an image to be printed as a label on disc 126, and other data for controller 116. Accordingly, memory 128 includes laser/OPU drivers 130, sled driver 132, and spindle driver 134. Sled driver 132 and spindle driver 134 execute in conjunction on processor 136 to control, respectively, the radial position of laser assembly 108 with respect to disc 126 and the rotational speed of disc 126. The speed of the disc 126 and radial location of laser assembly 108 are typically controlled so that data on the disc moves past the laser beam 124 at a constant linear velocity (CLV).

Laser/OPU drivers 130 include a read driver 138, a write driver 140, and a label driver 142. Laser/OPU drivers 130 are executable on processor 136 to control laser 118 and OPU 120 when reading data from the data side 144 of disc 126, writing data to the data side 144 of disc 126, and writing a label (e.g., text, graphics) to the non-data side 146 (i.e., the top side or label side) of disc 126 when the disc is flipped over in optical disc device 102. While spindle driver 134 and sled driver 132 rotate data on disc 126 past laser beam 124 at CLV, read driver 138 controls OPU 120 and the intensity of the laser 118 output to read the data by sensing light reflected off the metallic reflective layer of disc 126 (i.e., a CD-R disc) or the phase-change layer of disc 126 (i.e., a CD-RW disc). Similarly, write driver 140 controls OPU 120 and the intensity of the laser 118 output to write data to disc 126. In response to data from write driver 140, laser 118 generates pulsating laser beams 124 to record data onto the data side 144 of a disc 126.

Label driver 142 is configured to execute on processor 136 when a disc 126 is flipped over in the optical disc device 102 so the non-data side 146 of the disc 126 is facing the laser assembly 108. In general, label driver 142 receives label data (e.g., text data, image data) from computer 104 that it uses to control laser 118 for writing a label into the non-data side 146 of disc 126. In response to data from label driver 142, laser 118 generates pulsating laser beams 124 to record label data onto the non-data side 146 of disc 126. However, the conventional push-pull tracking scheme mentioned above for tracking the data side of a disc 126 is not available for tracking the non-data side 146 of the disc 126 because conventional discs (e.g., CD-Rs, CD-RWs, DVDs) have no tracks or other radial and circumferential position registration information available on their non-data sides 146. Accordingly, the exemplary embodiments section below discusses a radial and circumferential position registration on a trackless surface of an optical data storage disc 126.

Computer 104 can be implemented as a variety of general purpose computing devices including, for example, a personal computer (PC), a laptop computer, and other devices configured to communicate with optical disc device 102. Computer 104 typically includes a processor 144, a volatile memory 149 (i.e., RAM), and a nonvolatile memory 148 (e.g., ROM, hard disk, floppy disk, CD-ROM, etc.). Nonvolatile memory 148 generally provides storage of computer/processor-readable instructions, data structures, program modules and other data for computer 104. Computer 104 may implement various application programs 150 stored in memory 148 or volatile memory 149 and executable on processor 144 to provide a user with the ability to manipulate or otherwise prepare in electronic form, data such as music tracks to be written to the data side 144 of a disc 126 by disc device 102. Such applications 150 on computer 104 may also enable the preparation of a label, such as text and/or graphics, to be written to the non-data side 146 of a disc 126. In general, computer 104 outputs host data to disc device 102 in a driver format that is suitable for the device 102, which the disc device 102 converts and outputs in an appropriate format onto a writable CD (e.g., CD-R, CD-RW).

Exemplary Embodiments

Figure 2:
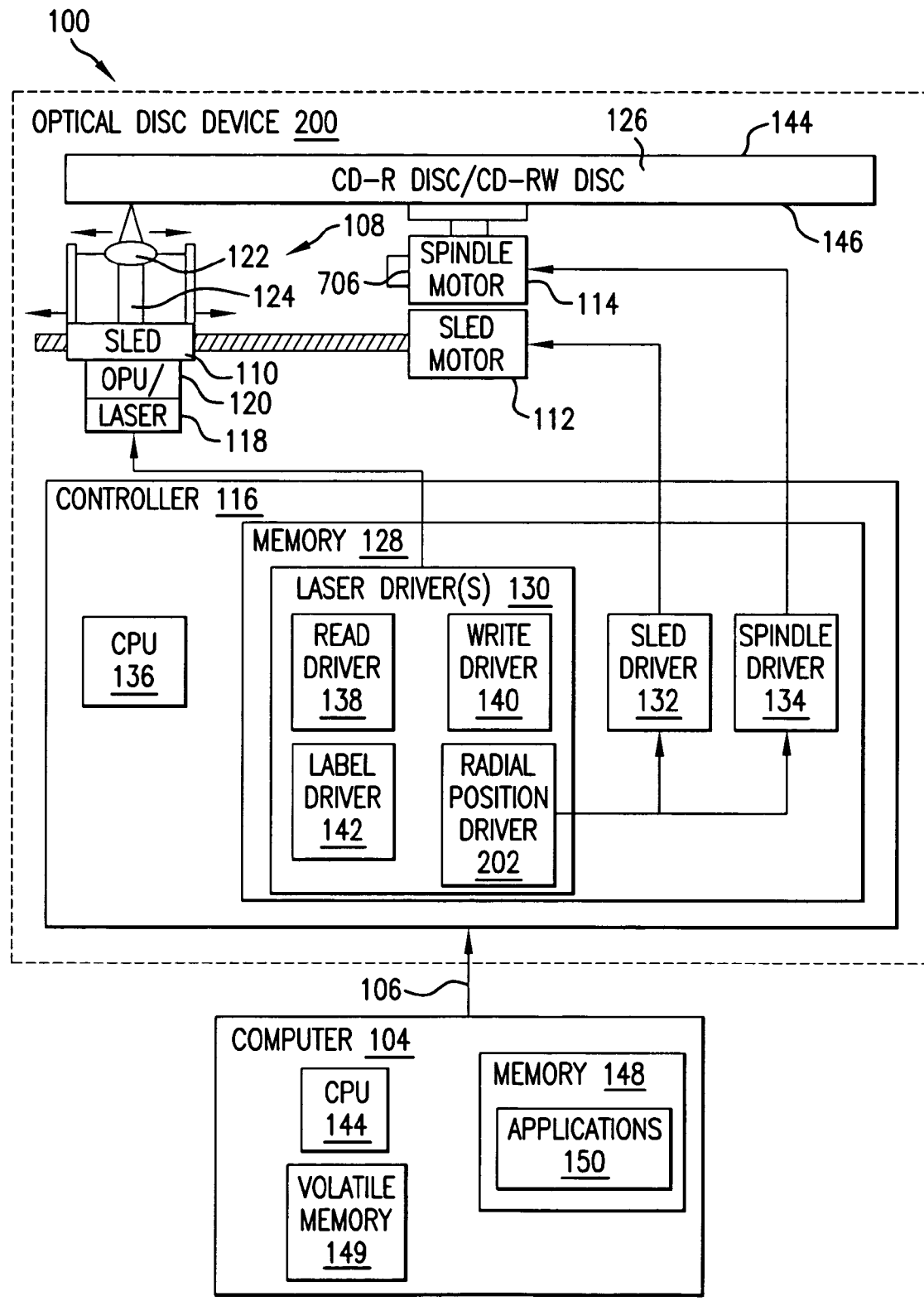
FIG. 2 illustrates an exemplary embodiment of an optical disc device suitable for implementing radial and circumferential position registration on a trackless optical disc surface, according to one embodiment of the present invention.

FIG. 2 illustrates an exemplary embodiment of an optical disc device 200 suitable for implementing radial and circumferential position registration on a trackless optical disc surface (e.g., the non-data side 146 of a disc 126) in an environment 100 such as that discussed above with reference to FIG. 1. It is to be understood that while optical disk device 200 is being described now, its implementation with respect to the present invention will be made clear when applied to FIGS. 7 and 8. The exemplary embodiment of the optical disc device 200 in FIG. 2 is configured in the same manner as the optical disc device 102 of FIG. 1, with the exception of radial position driver 202 stored in memory 128 and executable on processor 136. In addition, the exemplary embodiment of the optical disc device 200 presumes that an optical data storage disc 126 is inserted in the device 200 with the non-data side 146 toward the laser assembly 108 (i.e., with the top side 146 of the disc 126 facing down). Furthermore, the exemplary embodiment of the optical disc device 200 presumes that an optical data storage disc 126 may include a reference pattern on its non-data side 146.

Radial position driver 202 is generally configured to determine whether or not an optical disc 126 includes a reference pattern on its non-data side 146 from which an absolute radial position can be determined. To this end, radial position driver 202 controls spindle motor 114, hall sensors 706, sled motor 112, and laser assembly 108 in a manner similar to that discussed above in order to scan the disc 126 for a reference pattern or some other mark that indicates a reference pattern is present on the non-data side 146 of disc 126. If a reference pattern is present, radial position driver 202 controls spindle motor 114, sled motor 112, and laser assembly 108 to scan the reference pattern and register the laser beam 124 (i.e., the laser spot from the laser beam 124) to an absolute radial and circumferential position with respect to the disc 126. The registration process is discussed further below with regard to two exemplary reference patterns.

Figure 3:
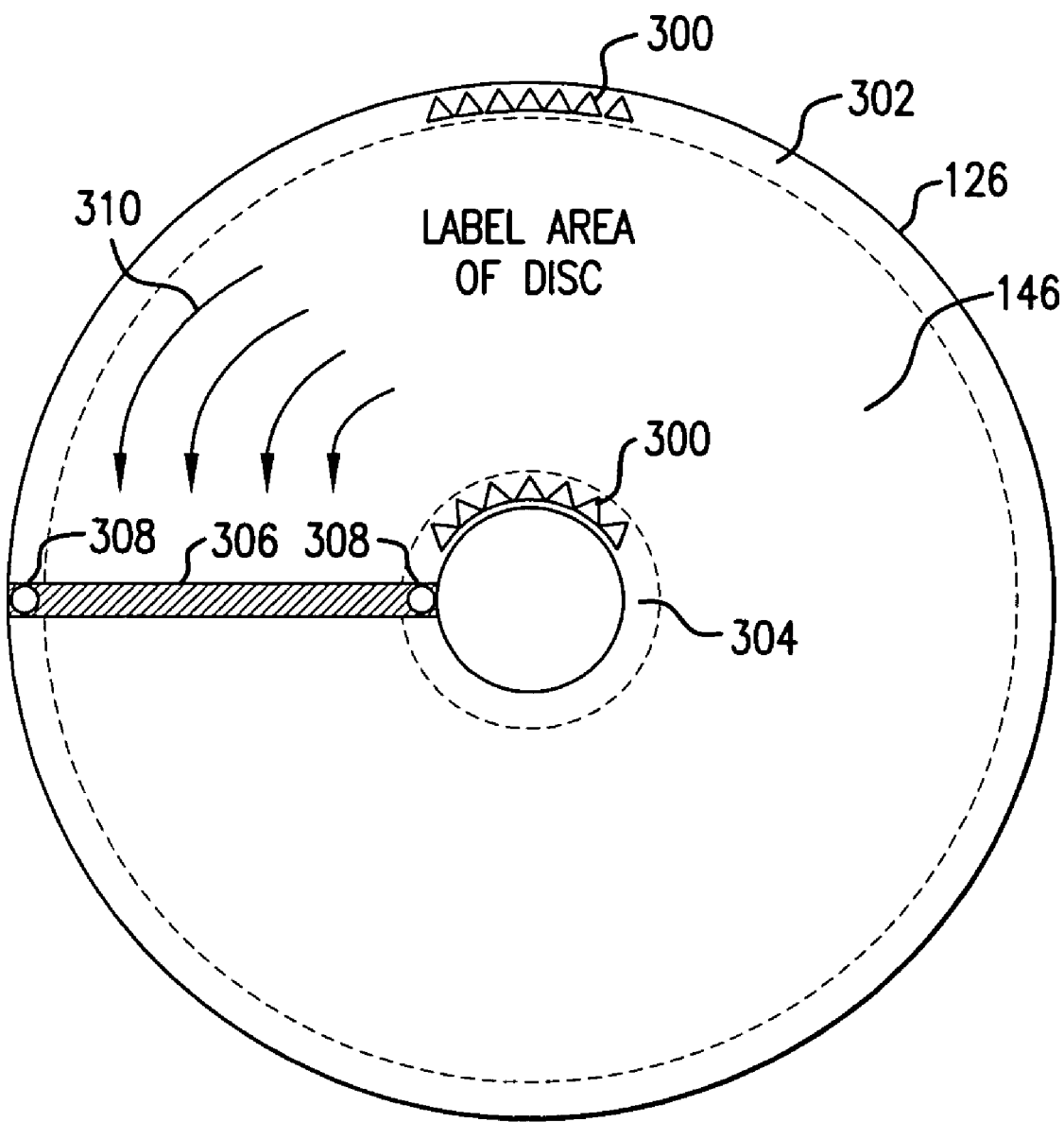
FIG. 3 illustrates an exemplary embodiment of an optical data storage disc having an exemplary reference pattern on a non-data side, according to one embodiment of the present invention.

FIG. 3 illustrates one embodiment of an optical data storage disc 126 having an exemplary reference pattern on a non-data side 146 that enables registration of an absolute radial position by the optical disc device 200 of FIG. 2. The non-data side 146 (i.e., the label side) of the disc 126 is displayed in FIG. 3. The FIG. 3 embodiment shows reference pattern 300 as a sawtooth pattern located in a region on disc 126 at an extreme outer diameter 302 and an extreme inner diameter 304. Although the reference pattern 300 is shown in both locations 302 and 304 in the FIG. 3, in some circumstances the pattern 300 may only be located in one or the other of these locations, and not both. Furthermore, the inner and outer diameters, 304 and 302, are preferred locations for a reference pattern 300 in order that the label area of the disc 126 can remain free for labeling. However, it is noted that this description is not intended to limit the location of reference patterns to the inner and outer diameters 302 and 304 of disc 126, and that such patterns might also be located elsewhere on disc 126.

FIG. 3 further illustrates part of the sled mechanism 306 shown in FIGS. 1 and 2 over which a sled 110 carries a laser assembly 108. At either end of this sled mechanism 306, and in both the extreme outer diameter 302 and extreme inner diameter 304 regions of disc 126, a laser spot 308 is shown. Direction arrows 310 indicate the direction of rotation of disc 126. Although not to scale, laser spot 308 is intended to illustrate how a reference pattern 300 is scanned as the disc 126 rotates the pattern 300 past the laser spot 308, either on the extreme inner diameter 304 or the extreme outer diameter 302 of the disc 126.

The patterns of light and dark in the reference pattern 300 (see also FIGS. 4-6) can be formed on disc 126 by various processes such as silk screening, etching or embossing. The dark patterned areas of reference pattern 300 represent dull areas of low reflectivity (FIGS. 4-6) on disc 126, while the light patterned areas (i.e., the areas that are not marked) represent shiny areas of high reflectivity (FIGS. 4-6) on disc 126. In general, scanning areas of varying reflectivity on a disc 126 generates a reflectivity signal through the OPU 120 (FIG. 2) whose amplitude changes in response to the changing reflectivity of the disc 126.

Figure 4:
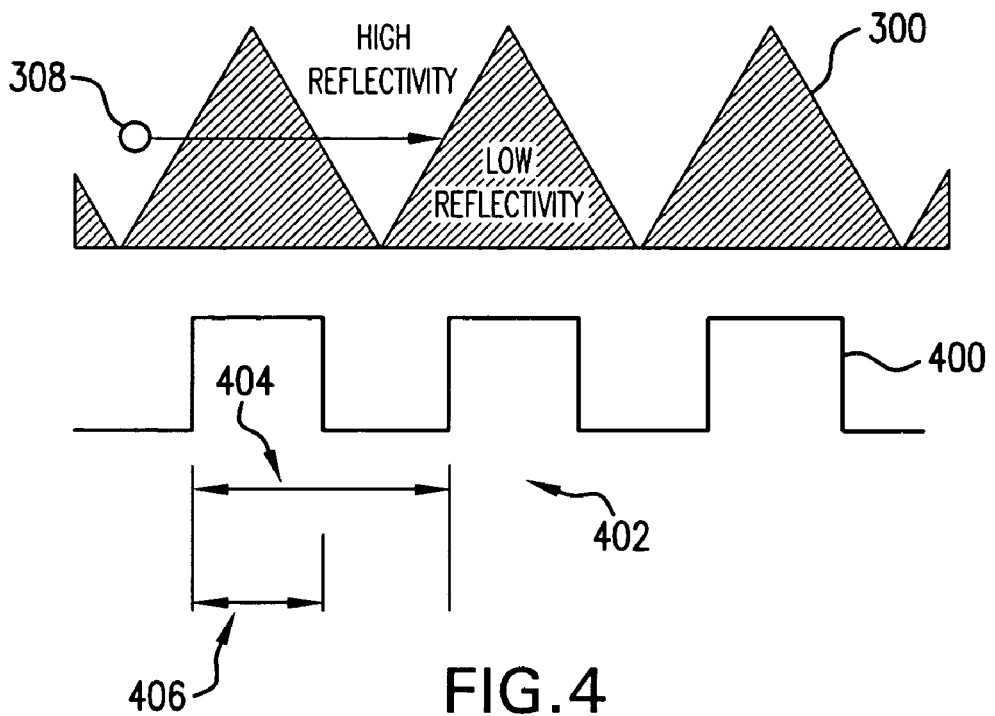
FIGS. 4, 5, and 6 illustrate examples of using a reference pattern to generate a signal whose duty cycle is used to register an absolute radial position on an optical data storage disc, according to one embodiment of the present invention.
Figure 5:
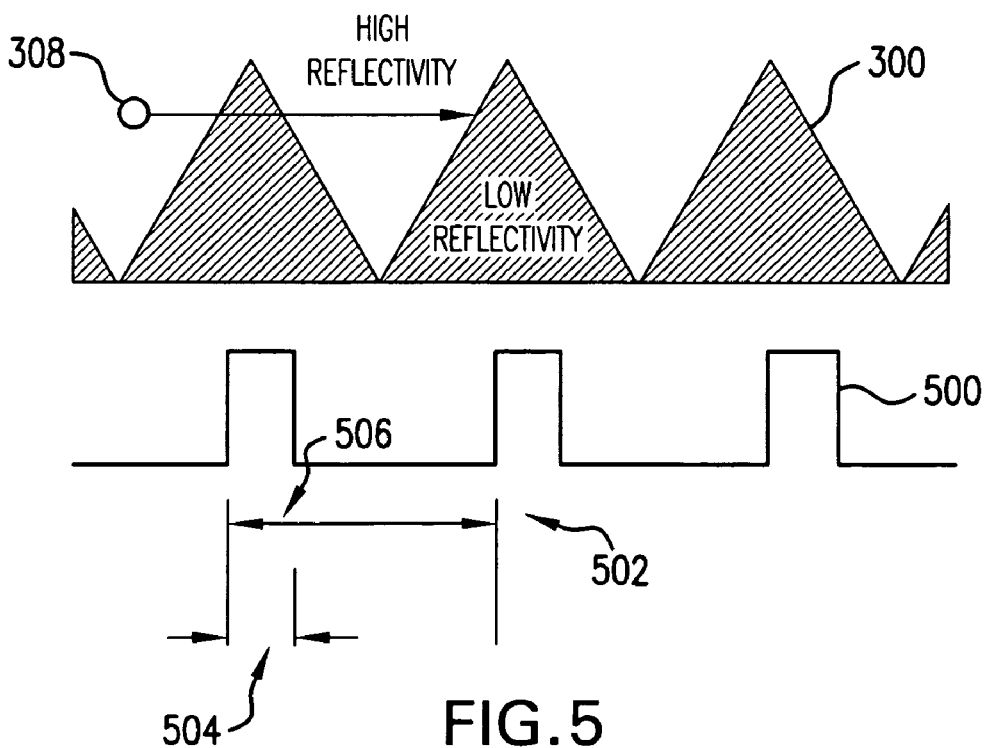
Figure 6:
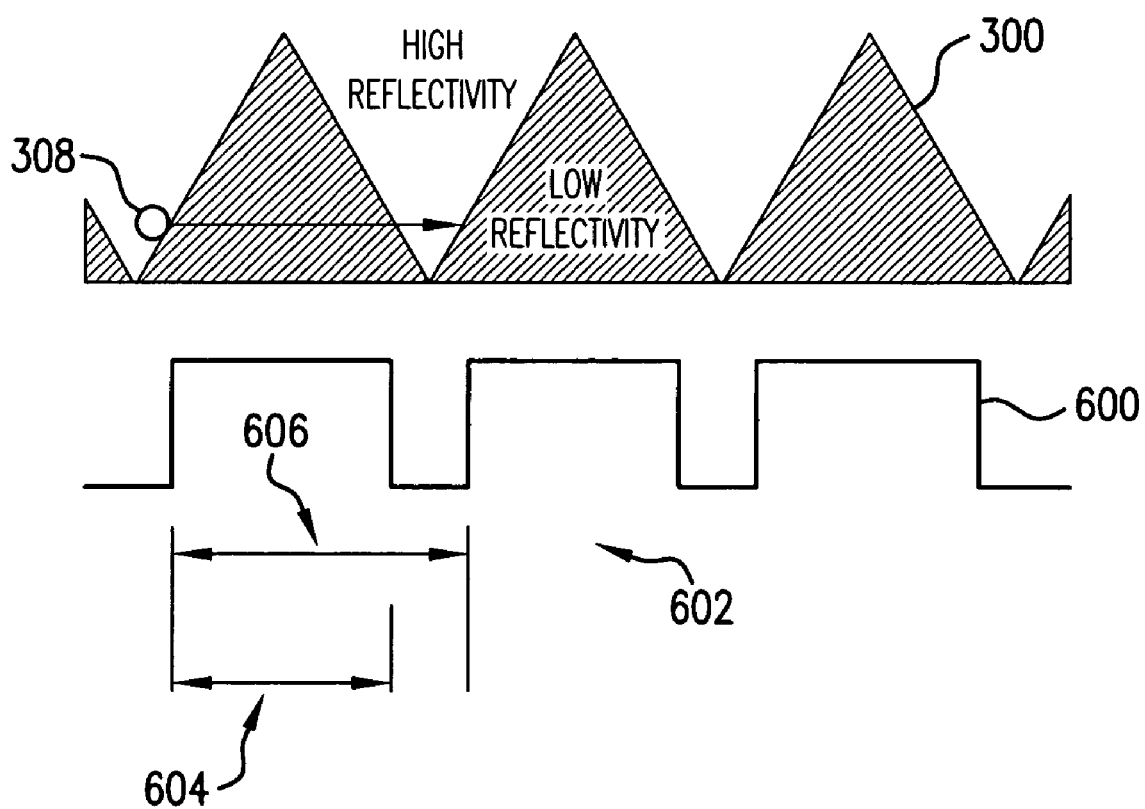

The exemplary sawtooth pattern 300 of FIG. 3 is further illustrated in FIGS. 4-6. FIGS. 4-6 demonstrate the use of the sawtooth pattern 300 to register or determine an absolute/reference radial and circumferential position of a laser beam 124 (i.e., the laser spot 308 of FIG. 3) in the optical disc device 200 of FIG. 2 based on the timing of pulses in a reflectivity pattern. The absolute/reference radial and circumferential position is a radial location within the reference pattern 300 that can be used as a reference track to which all radial and circumferential positioning can be referenced. Each of the FIGS. 4-6 illustrates the exemplary sawtooth pattern, a reflectivity signal response generated by the OPU 120 (FIG. 2) when the laser assembly 108 scans the pattern with a laser spot 308, and the relative pulse durations of the reflectivity signal. As shown in FIGS. 4-6, the peaks and valleys of the sawtooth pattern 300 define a slanted interface between the low reflectivity region and the high reflectivity region of disc 126.

FIG. 4 illustrates the case where the laser spot 308 is located at the absolute/reference radial position. As the laser spot 308 moves between the low and high reflectivity regions in the sawtooth pattern 300 on disc 126, the OPU 120 generates a reflectivity signal 400 based on the amount of light reflecting off the disc 126. Because the laser spot 308 in FIG. 4 is centered midway between the peaks and valleys of the sawtooth pattern 300, the reflectivity signal 400 has a (nearly) 50% duty cycle. That is, the ratio of the pulse duration 404 to the pulse period 406 is (nearly) 50%. The pulses 402 in the reflectivity signal 400 of FIG. 4 are rectangular in shape (i.e., saturated at the top and bottom) because the laser spot 308 is very small by comparison to the sawtooth pattern 300, and it is therefore either completely within a low reflectivity region or completely within a high reflectivity region as it scans the pattern 300. In addition, the laser spot 308 is traveling very fast relative to the sawtooth pattern 300 and therefore traverses the interface between the low and high reflectivity regions virtually instantaneously. Thus, transitions between high and low signal saturations in the reflectivity signal 400 are also virtually instant, and they appear as straight vertical lines. It is noted that the sawtooth pattern 300 is only one example of a pattern that may achieve this type of response, and that other patterns having similarly slanted interfaces between two surfaces of different reflectivities relative to the radius of the disc 126 might also be useful to produce similar results.

Referring again to the particular optical disc device embodiment of FIG. 2, the radial position driver 202 is further configured to analyze the duty cycle of the reflectivity signal 400 as the reference pattern 300 is being scanned, and to adjust the laser assembly 108 position (i.e., the laser spot 308 position) by controlling the sled motor 114 until the duty cycle is brought within a given threshold range. If the duty cycle is below the threshold range, the laser assembly 108 (laser spot 308) is moved in a first direction that brings the duty cycle within the threshold range. If the duty cycle is above the threshold range, the laser assembly (laser spot 308) is moved in a second direction that brings the duty cycle within the threshold range. The threshold range for the duty cycle is typically set to be within a percentage point or two around 50% (e.g., 49% to 51% duty cycle range).

FIG. 5 illustrates the case where the laser spot 308 is located higher on the sawtooth pattern 300 than the absolute/reference radial position. That is, the laser spot 308 is at a radial distance that is too far from the inner diameter of the disc 126. As discussed above, in this scenario the radial position driver 202 measures pulse widths 502 to analyze the duty cycle (i.e., the ratio of the pulse duration 504 to the pulse period 506) and determine if the laser spot 308 needs an adjustment toward the absolute/reference radial position. It is clear from FIG. 5 that the laser spot 308 is not positioned midway between the peaks and valleys of the sawtooth pattern 300. Rather, the laser spot 308 is positioned too near the peaks of the low reflectivity region of the sawtooth pattern 300. The duty cycle for the reflectivity signal 500 illustrates this because the ratio of pulse duration 504 to pulse period 506 is significantly below 50%. Upon determining that the duty cycle is below a given threshold (e.g., 49% to 51%), the radial position driver 202 controls the sled motor 112 (FIG. 2) to adjust the laser assembly 108 position (i.e., the laser spot 308 position) until the duty cycle is brought within the given threshold range.

FIG. 6 illustrates the case where the laser spot 308 is located lower on the sawtooth pattern 300 than the absolute/reference radial position. That is, the laser spot 308 is at a radial distance that is too close to the inner diameter of the disc 126. As discussed above, in this scenario the radial position driver 202 measures pulse widths 602 to analyze the duty cycle (i.e., the ratio of the pulse duration 604 to the pulse period 606) and determine if the laser spot 308 needs an adjustment toward the absolute/reference radial position. It is clear from FIG. 6 that the laser spot 308 is not positioned midway between the peaks and valleys of the sawtooth pattern 300. Rather, the laser spot 308 is positioned too near the peaks of the high reflectivity region of the sawtooth pattern 300. The duty cycle for the reflectivity signal 600 illustrates this because the ratio of pulse duration 604 to pulse period 606 is significantly above 50%. Upon determining that the duty cycle is above a given threshold (e.g., 49% to 51%), the radial position driver 202 controls the sled motor 112 (FIG. 2) to adjust the laser assembly 108 position (i.e., the laser spot 308 position) until the duty cycle is brought within the given threshold range. It is to be understood that the beam must be fully within the sawtooth marks in order to determine the location with respect to the positioning system for each spot.

Figure 7:
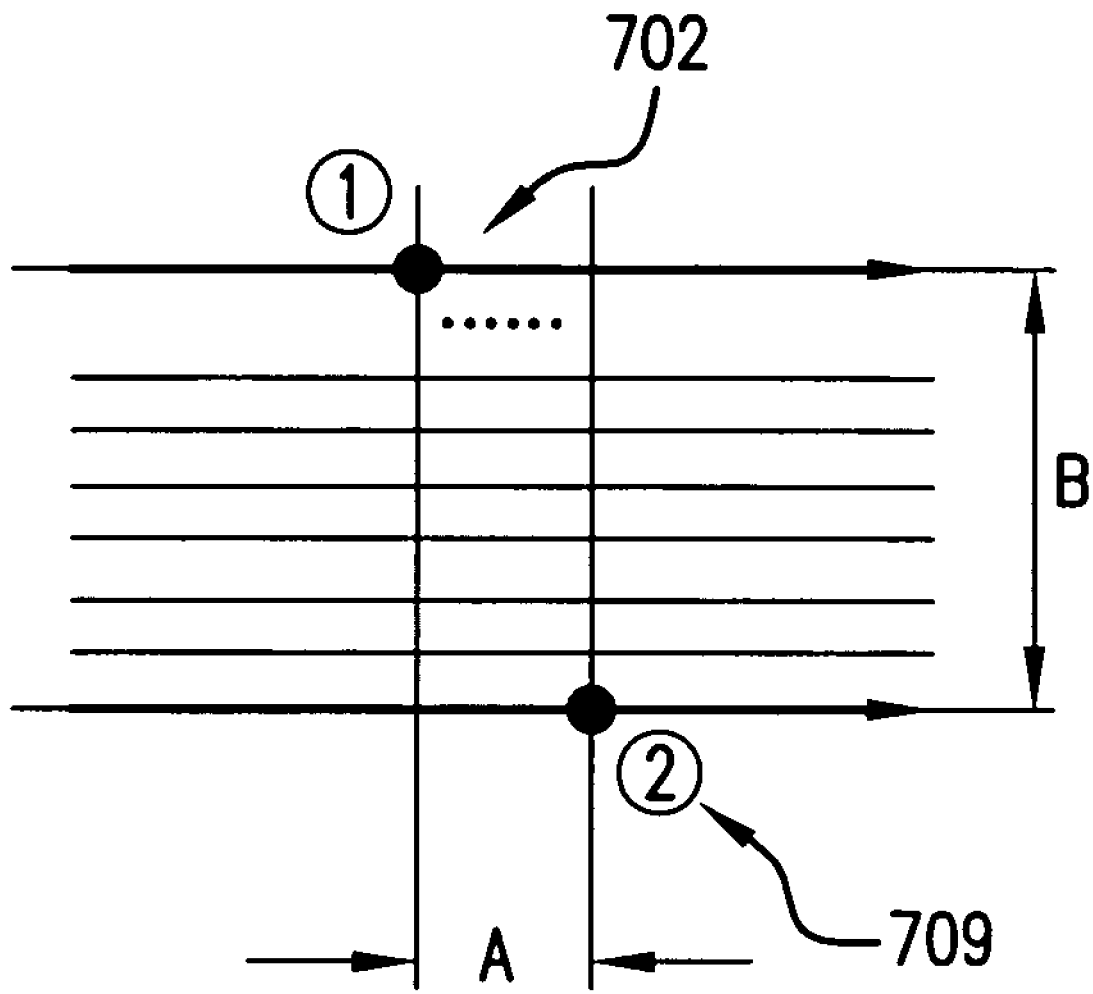
FIG. 7 is a schematic illustration of the spots made by the laser beams on the disk surface, according to one embodiment of the present invention.

Most likely, at the surface of disk 126, the spots or circles 702, 704 made by the laser beams 124 on the disk surface will lie in proximity to another, as illustrated in FIG. 7. There will be both radial error (B) and circumferential error (A) that will cause two different circles 702, 704 to be printed as the disk 126 rotates. In order to correctly use these two circles 702, 704 to construct a complete image, it is necessary to determine how far apart they are in both directions.

The location of the two spots 702, 704 can be determined by referencing them against some other known positional information on the disk 126. In the present invention, as previously discussed, there are sawtooth patterns (FIGS. 3-6) in the outer ring of the disk 126 inner diameter (ID) that can be used to determine radial position of one of the spots 702, 704. The index mark in the same ring can be used to determine circumferential location of the spot 702, 704.

To measure the circumferential location of the spots 702, 704, a timing function is needed that has sub-pixel resolution. Preferably, this can be a crystal-based timer that is reset and started once per revolution on some event synchronous with the disk 126, such as a certain hall sensor edge. In a typical optical disk drive, the spindle motor 114 uses three hall sensors 706 mounted in the spindle assembly that produce a number of fixed timing edges as the spindle rotates. Knowing the number of hall edges per revolution, a hall edge can be arbitrarily selected as the "index" edge and hall edges can be counted to determine coarsely where the spindle is rotationally.

To determine the positioning of the two spots 702, 704, the laser assembly 108 is adjusted until at least one of the spots 702, 704 is over the outer ring 302 (FIG. 3) of disk 126. The laser not being measured is turned off at this point. The reflectivity of the surface beneath the spot 702, 704 is measured by observing the output of the photodiode (not shown) that is mounted to receive light reflected from the disk surface. The reflectivity signal is conventionally sampled at a high rate and a portion of the running sampled data is compared against a stored pattern that represents what the disk 126 ID index mark should look like. When there is a match between the samples and the stored pattern, the disk 126 ID index mark has been located. The count of the timer at this point is recorded and this represents how many counts after the index hall edge the disk 126 ID index mark occurs.

Next the relative radial position of the spot 702, 704 in question is determined using the apparatus described in FIGS. 1-6, where the duty cycle of the light reflecting from the sawtooth pattern is measured. The radial position of the spot 702, 704 is determined from the duty cycle by knowing the start radius and height of the sawtooth pattern. The begin and end times of the sawteeth are determined by counting from the disk 126 ID index mark count previously determined. From this procedure, a relationship between the positioning mechanism and the radial location of the spot 702, 704 is established.

The same must now be done for the other spot 702, 704. The second laser is turned off while the first is turned on and the count to disk 126 ID index mark, as registered by the second laser, and the radial location are determined as was done before.

Using the count from index for the two spots 702, 704, the two lasers can be driven with pixel data that is timed to be laid down with the correct phase relative to the disk 126 ID index mark.

Most likely, it will be necessary to design for a nominal spacing in the radial direction of the two tracks on the order of several tracks. The two spots 702, 704 are to be used to write two tracks of data at the same time. The most likely scenario for doing this is to adjust the track spacing such that the two spots 702, 704 then lie an odd number of integer multiples of tracks apart.

Suppose the spots 702, 704 are designed to be nominally 19 tracks apart. The track pitch is nominally 42 um. If the spots for a given head actually lay 730 um apart, instead of the target 798 um, then the track spacing would be adjusted to be 42.9 um, and assume 17 tracks spacing. As both lasers are fired, one spot 702, 704 writes even tracks while the other writes odd tracks and the position of the laser can skip a track each time it advances. It is also possible to work with an even number of tracks apart by writing half the number of tracks between the two and then skipping that same number of tracks ahead before resuming print. If the head is a rotary head such that the spacing between the lasers changes as the head rotates, the track spacing could be adjusted as printing progresses to account for this change. If the change is significant to cause a noticeable change in L* the laser power or spindle speed can be adjusted to offset this change in L*.

It is to be understood that an similar approach could be used to print with three heads. In this case, a track spacing would be chosen that puts the three spots nearly on three positions that would interleave if two tracks were skipped between each print.

It is also to be understood that the same approach could be cause the spots 702, 704 to exactly overwrite each other which can be used to create color markings. In this case, the spacing would be designed to be an integer multiple apart and tracks would be laid down at the spacing that causes them to be an integer multiple apart.

Exemplary Method

Figure 8:
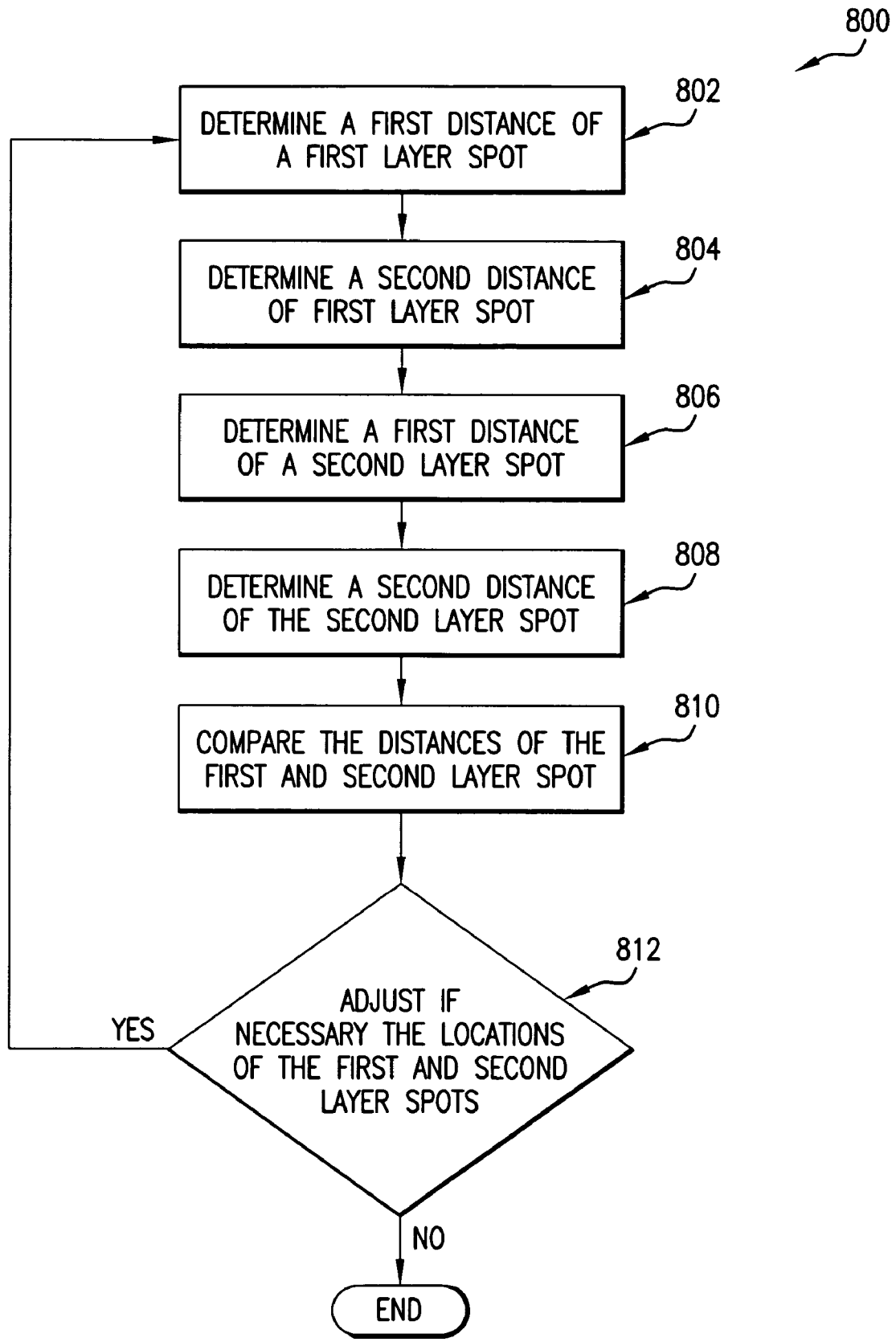
FIG. 8 is a flow diagram illustrating an example method for laser spot location and adjustment on a trackless optical disc surface, according to one embodiment of the present invention.

An example method 800 for laser spot location and adjustment on a trackless optical disc surface will now be described with primary reference to the flow diagram of FIG. 8. The method 800 applies generally to the exemplary embodiments discussed above with respect to FIGS. 1-7. As shown in FIG. 8, method 800 includes, in part, the steps of: determining a first distance of a first laser spot (step 802), determining a second distance of the first laser spot (step 804), determining a first distance of a second laser spot (step 806), determining a second distance of the second laser spot (step 808), comparing the distances of the first and second laser spots (step 810), and adjusting, if necessary, the locations of the first and second laser spots (step 812).

With respect to steps 802-808, a circumferential distance (step 802) and a radial distance (step 804) of the first laser spot are determined. Subsequently, the circumferential distance (step 806) and the radial distance (step 808) of the second laser spot are determined. It is to be understood that while the circumferential distance is determined and the radial distance is later determined, the radial distance could be determined first and the circumferential distance could be subsequently determined.

With respect to step 810, the circumferential and radial distances of spots 702, 704 (FIG. 7) are determined. If an adjustment is needed to correct location of one spot 702, 704 with respect the other, adjustments in tracking, as described above, can be instituted.

With respect to the present invention it is to be understood that a fine resolution positioning system (not shown) would be used. For example, an actuator with an optical encoder could be employed so that the actuator location is known at any time. Then, the radial position of a spot is determined by reading what the encoder is relaying for the position of the actuator. The procedure is repeated for the second spot. When this is completed, four pieces of information are obtained: the actuator position reading and the radial position of the first spot (according to the sawteeth) for that actuator position, and these same two pieces of information for the second spot. By knowing that the first spot is at, say, Y1 microns into the sawteeth pattern when the actuator is at position X1, we can extrapolate and know that when we move the actuator to position X2, the corresponding spot will be at Y2.

Although the description above uses language that is specific to structural features and/or methodological acts, it is to be understood that the invention defined in the appended claims is not limited to the specific features or acts described. Rather, the specific features and acts are disclosed as exemplary forms of implementing the invention.

It is to be understood that the flowchart of FIG. 8 shows the architecture, functionality, and operation of one implementation of the present invention. If embodied in software, each block may represent a module, segment, or portion of code that comprises one or more executable instructions to implement the specified logical function(s). If embodied in hardware, each block may represent a circuit or a number of interconnected circuits to implement the specified logical function(s).

Also, the present invention can be embodied in any computer-readable medium for use by or in connection with an instruction-execution system, apparatus or device such as a computer/processor based system, processor-containing system or other system that can fetch the instructions from the instruction-execution system, apparatus or device, and execute the instructions contained therein. The computer-readable medium can comprise any one of many physical media such as, for example, electronic, magnetic, optical, electromagnetic, infrared, or semiconductor media. More specific examples of a suitable computer-readable medium would include, but are not limited to, a portable magnetic computer diskette such as floppy diskettes or hard drives, a random access memory (RAM), a read-only memory (ROM), an erasable programmable read-only memory, or a portable compact disc.

Those skilled in the art will understand that various embodiment of the present invention can be implemented in hardware, software, firmware or combinations thereof. Separate embodiments of the present invention can be implemented using a combination of hardware and software or firmware that is stored in memory and executed by a suitable instruction-execution system. If implemented solely in hardware, as in an alternative embodiment, the present invention can be separately implemented with any or a combination of technologies which are well known in the art (for example, discrete-logic circuits, application-specific integrated circuits (ASICs), programmable-gate arrays (PGAs), field-programmable gate arrays (FPGAs), and/or other later developed technologies. In preferred embodiments, the present invention can be implemented in a combination of software and data executed and stored under the control of a computing device It will be well understood by one having ordinary skill in the art, after having become familiar with the teachings of the present invention, that software applications may be written in a number of programming languages now known or later developed.

Although the flowchart of FIG. 8 shows a specific order of execution, the order of execution may differ from that which is depicted. For example, the order of execution of two or more blocks may be scrambled relative to the order shown. Also, two or more blocks shown in succession in FIG. 8 may be executed concurrently or with partial concurrence. All such variations are within the scope of the present invention.

Once given the above disclosure, many other features, modifications or improvements will become apparent to the skilled artisan. Such features, modifications or improvements are, therefore, considered to be a part of this invention, the scope of which is to be determined by the following claims.

What is claimed is:

1. A method of determining the location of a plurality of laser spots impinged on an optical medium, comprising:
    determining a circumferential distance of a first laser spot from a predetermined feature on the medium;
    determining a radial distance of the first laser spot from the feature;
    determining a circumferential distance of a second laser spot from the feature;
    determining a radial distance of the second laser spot from the feature; and
    wherein the locations of the first and second laser spots determine the pixel data applied to a first laser and a second laser when labeling a trackless surface of the optical medium.

2. The method, as in claim 1, wherein the determining the circumferential distance of the first laser spot comprises:
    locating the first spot over an outer ring of a disk;
    measuring a light pattern reflected from the disk surface;
    comparing the actual light pattern against a stored light pattern;
    determining when a match between the actual pattern and the stored pattern occurs; and
    recording a timer count.

3. The method, as in claim 1, wherein the determining the radial distance of the first laser spot comprises:
    measuring a duty cycle of light reflected from a reflective pattern located on a disk;
    determining a radial position of the first laser spot; and
    determining a begin and end time of the reflective pattern.

4. The method, as in claim 1, wherein the determining the circumferential distance of the second laser spot comprises:
    locating the second spot over an outer ring of a disk;
    measuring a light pattern reflected from the disk surface;
    comparing the actual light pattern against, a stored light pattern;
    determining when a match between the actual pattern and the stored pattern occurs; and
    recording a timer count.

5. The method, as in claim 1, wherein the determining the radial distance of the second laser spot comprises:
    measuring a duty cycle of light reflected from a reflective pattern located on a disk;
    determining a radial position of the second laser spot; and
    determining a begin and end time of the reflective pattern.

6. The method, as in claim 1, wherein the method further comprises:
    using a count from index for the first and second spots; and
    operating the first and second lasers to compensate for the difference in location between the first and second spots.

7. The method, as in claim 6, wherein the compensating step comprises:
    driving the first and second lasers with pixel data that is timed to be laid down with a correct phase relative to an index mark located substantially on the disk.

8. The method, as in claim 1, comprising:
    adjusting a track spacing to make the tracks fall in integer multiple of tracks apart.

9. A system for determining the location of a plurality of laser spots impinged on an optical medium, comprising:
    means for determining a circumferential distance of a first laser spot from a predetermined feature on the medium;
    means for determining a radial distance of the first laser spot from the feature;
    means for determining a circumferential distance of a second laser spot from the feature;
    means for determining a radial distance of the second laser spot from the feature; and
    wherein the locations of the first and second laser spots determine the pixel data applied to a first laser and a second laser when labeling a trackless surface of the optical medium.

10. The system, as in claim 9, wherein the means for determining the circumferential distance off the first laser spot means comprises:
    means for locating the first spot over an outer ring of a disk;
    means for measuring a light pattern reflected from the disk surface;
    means for comparing the actual light pattern against a stored light pattern;
    means for determining when a match between the actual pattern and the stored pattern occurs; and
    means for recording a timer count.

11. The system, as in claim 9, wherein the means for determining the radial distance of the first laser spot comprises:
    means for measuring a duty cycle of light reflected from a reflective pattern located on a disk;
    means for determining a radial position of the first laser spot; and
    means for determining a begin and end time of the reflective pattern.

12. The system, as in claim 9, wherein the means for determining the circumferential distance of the second laser spot comprises:
    means for locating the second spot over an outer ring of a disk;
    means or measuring a light pattern reflected from the disk surface;
    means for comparing the actual light pattern against a stored light pattern;
    means for determining when a match between the actual pattern and the stored pattern occurs; and
    means for recording a timer count.

13. The system, as in claim 9, wherein the means for determining the radial distance of the second laser spot comprises:
    means for measuring a duty cycle of light reflected from a reflective pattern located on a disk;
    means for determining a radial position of the second laser spot; and
    means for determining a begin and end time of the reflective pattern.

14. The system, as in claim 9, wherein the system further comprises:
    means for using a count from index for the first and second spots and means for operating the first and second lasers to compensate for the difference in location between the first and second spots.

15. The system, as in claim 14, wherein the compensating means comprises:
means for driving the first and second lasers with pixel data that is timed to be laid down with a correct phase relative to an index mark located substantially on the disk.

16. The system, as in claim 9, comprising;
means for adjusting a track spacing to make the tracks fall in integer multiple of tracks apart.

17. A processor-readable medium comprising processor executable instructions configured to, when executed by a processor, cause the processor to perform a method of determining the location of a plurality of laser spots impinged on an optical medium, comprising:
determining a circumferential distance of a first laser spot from a predetermined feature on the optical medium;
determining a radial distance of the first laser spot from the feature;
determining a circumferential distance of a second laser spot from the feature;
determining a radial distance of the second laser spot from the feature; and
wherein the locations of the first and second laser spots determine the pixel data applied to a first laser and a second laser when labeling a trackless surface of the optical medium.

18. The processor-readable medium as in claim 17, wherein the determining the circumferential distance of the first laser spot comprises:
locating the first spot over an outer ring of a disk;
measuring a light pattern reflected from the disk surface;
comparing the actual light pattern against a stored light pattern;
determining when a match between the actual pattern and the stored pattern occurs; and
recording a timer count.

19. The processor-readable medium, as in claim 17, wherein the determining the radial distance of the first laser spot comprises:
measuring a duty cycle of light reflected from a reflective pattern located on a disk;
determining a radial position of the first laser spot; and
determining a begin and end time of the reflective pattern.

20. The processor-readable medium, as in claim 17, wherein the determining the circumferential distance of the second laser spot comprises:
locating the second spot over an outer ring of a disk;
measuring a light pattern reflected from the disk surface;
comparing the actual light pattern against a stored light pattern;
determining when a match between the actual pattern and the stored pattern occurs; and
recording a timer count.

21. The processor-readable medium, as in claim 17, wherein the determining the radial distance of the second laser spot comprises:
measuring a duty cycle of light reflected from a reflective pattern located on a disk;
determining a radial position of the second laser spot; and
determining a begin and end tine of the reflective pattern.

22. The processor-readable medium, as in claim 17, wherein the method further comprises:
using a count from index for the first and second spots; and
operating the first and second lasers to compensate for the difference in location between the first and second spots.

23. The processor-readable medium, as in claim 22, wherein the compensating step comprises:
driving the first and second lasers with pixel data that is timed to be layed down with a correct phase relative to an index mark located substantially on the disk.

24. The processor-readable medium, as in claim 17, comprising;
adjusting a track spacing to make the tracks fall in integer multiple of tracks apart.

25. A method of forming visible marks on an optical medium, comprising:
impinging first and second laser beams onto a trackless surface of an optical medium having a varying-reflectivity feature of known position so as to generate reflectivity signals;
determining from the reflectivity signals a radial displacement and a circumferential displacement of the first and second laser beams from a nominal position; and
selecting pixel data for driving the first and second laser beams that compensates for the radial and circumferential displacements of the first and second laser beams; and
driving the first and second laser beams with the selected pixel data to mark the optical medium.

26. The method of claim 25, wherein the varying-reflectivity feature includes a sawtooth pattern at a predetermined radial position.

27. The method of claim 26, wherein the radial displacement of each of the first and second laser beams is determined from a duty cycle of the reflectivity signals generated from the sawtooth pattern for the corresponding laser beam.

28. The method of claim 26, wherein the selecting includes selecting pixel data for a first track corresponding to the first laser beam and a second track corresponding to the second laser beam, wherein the first and second tracks are spaced radially apart by a distance derived at least in part from the radial displacements.

29. The method of claim 25, wherein the varying-reflectivity feature includes an index mark at a predetermined circumferential position.

30. The method of claim 29, wherein the circumferential displacement of each of the first and second laser beams is determined from a timing count between a reference position and the index mark for the corresponding laser beam.

31. The method of claim 29, wherein the selecting includes selecting pixel data that is timed to he laid down with the correct phase relative to the index mark.

32. The method of claim 25, wherein the impinging and determining are sequentially performed for only one laser beam at a time.

* * * * *

UNITED STATES PATENT AND TRADEMARK OFFICE
CERTIFICATE OF CORRECTION

PATENT NO. : 7,596,067 B2  Page 1 of 1
APPLICATION NO. : 11/214203
DATED : September 29, 2009
INVENTOR(S) : D. Mitchel Hanks et al.

It is certified that error appears in the above-identified patent and that said Letters Patent is hereby corrected as shown below:

In column 11, line 51, in Claim 4, delete "against," and insert -- against --, therefor.

In column 12, line 24, in Claim 10, delete "off" and insert -- of --, therefor.

In column 12, line 25, in Claim 10, after "spot" delete "means".

In column 13, line 29, in Claim 18, after "medium" insert -- , --.

In column 14, line 2, in Claim 21, delete "tine" and insert -- time --, therefor.

In column 14, line 11, in Claim 23, delete "layed" and insert -- laid --, therefor.

In column 14, line 54, in Claim 31, delete "he" and insert -- be --, therefor.

Signed and Sealed this

Twenty-sixth Day of October, 2010

David J. Kappos
*Director of the United States Patent and Trademark Office*